Nov. 24, 1936.  E. W. SWARTWOUT  2,062,110
TRANSFORMER MEASURING INSTRUMENT
Filed June 6, 1930     4 Sheets-Sheet 1
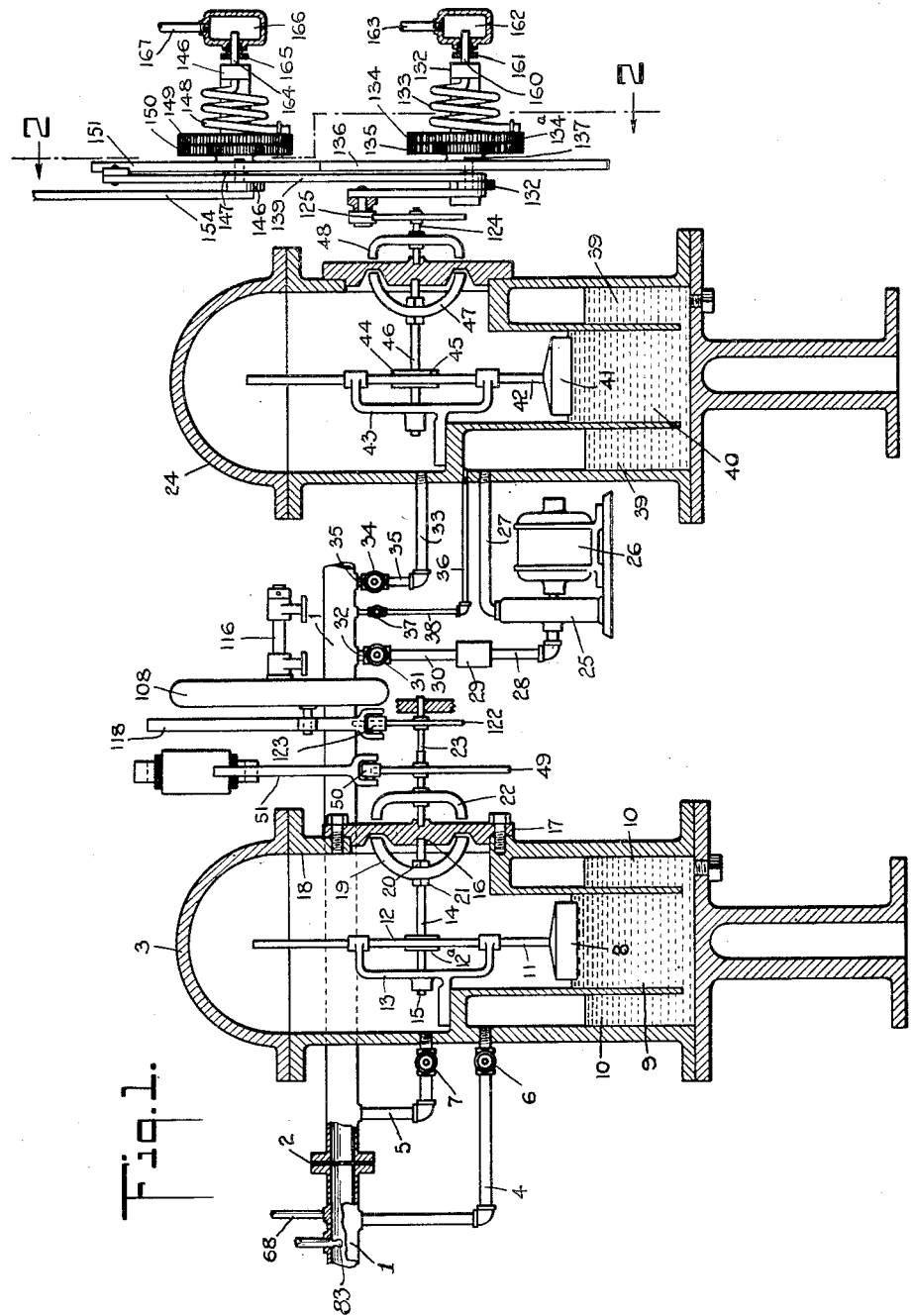
INVENTOR
Everett W. Swartwout,
BY Henry J. Luake,
ATTORNEY.

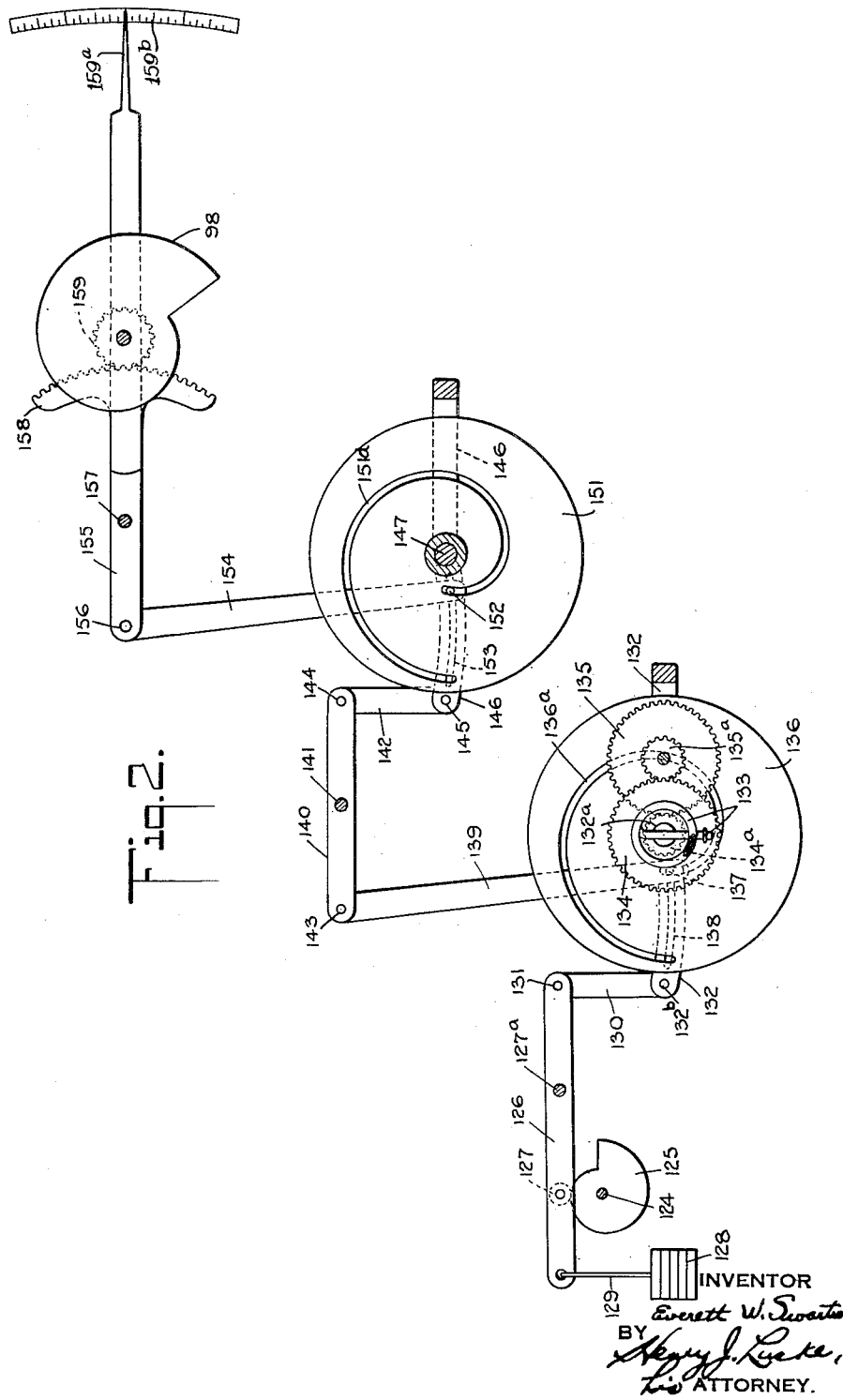

Nov. 24, 1936.  E. W. SWARTWOUT  2,062,110
TRANSFORMER MEASURING INSTRUMENT
Filed June 6, 1930   4 Sheets-Sheet 3
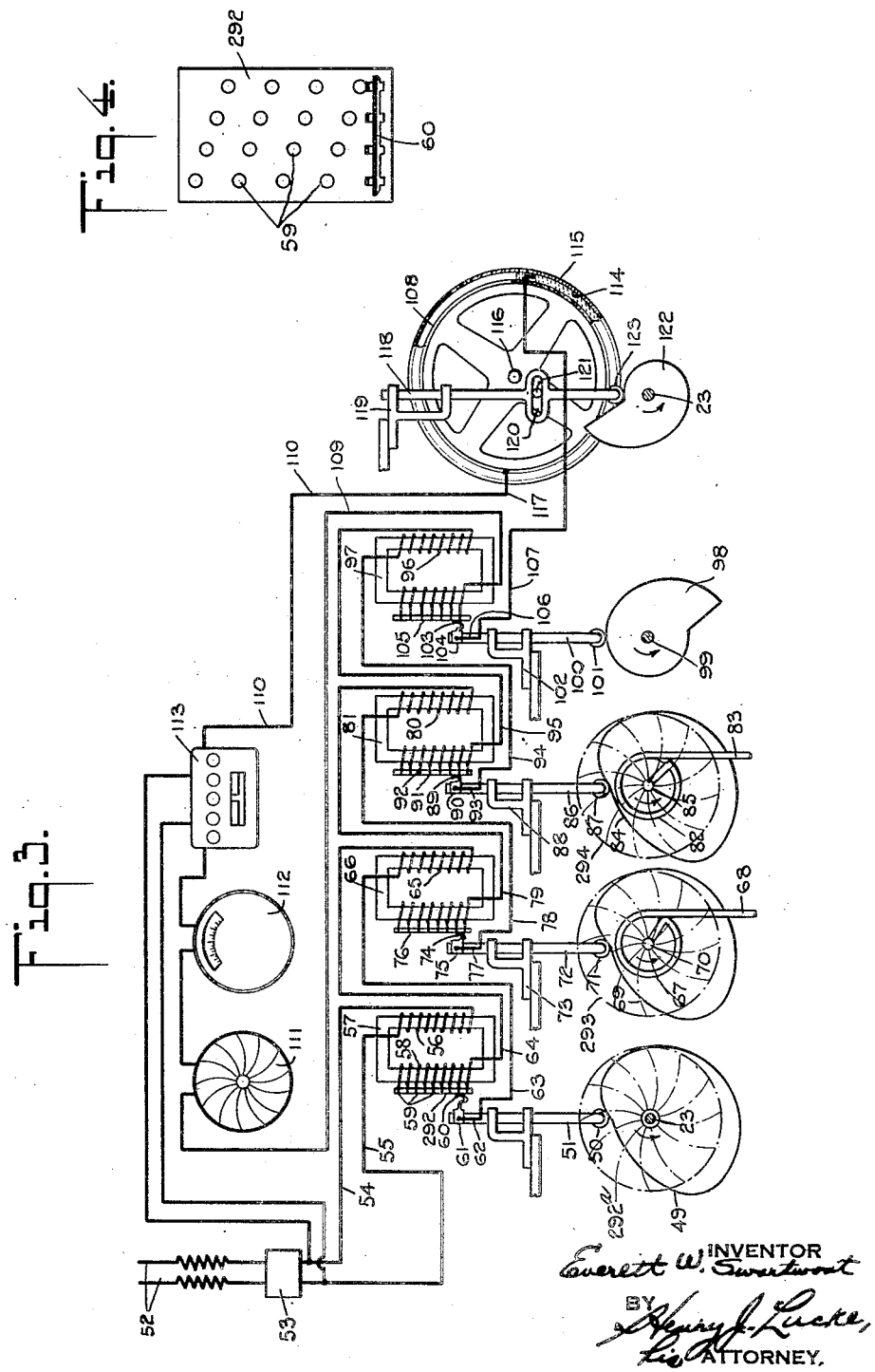

Nov. 24, 1936.　　E. W. SWARTWOUT　　2,062,110
TRANSFORMER MEASURING INSTRUMENT
Filed June 6, 1930　　4 Sheets-Sheet 4
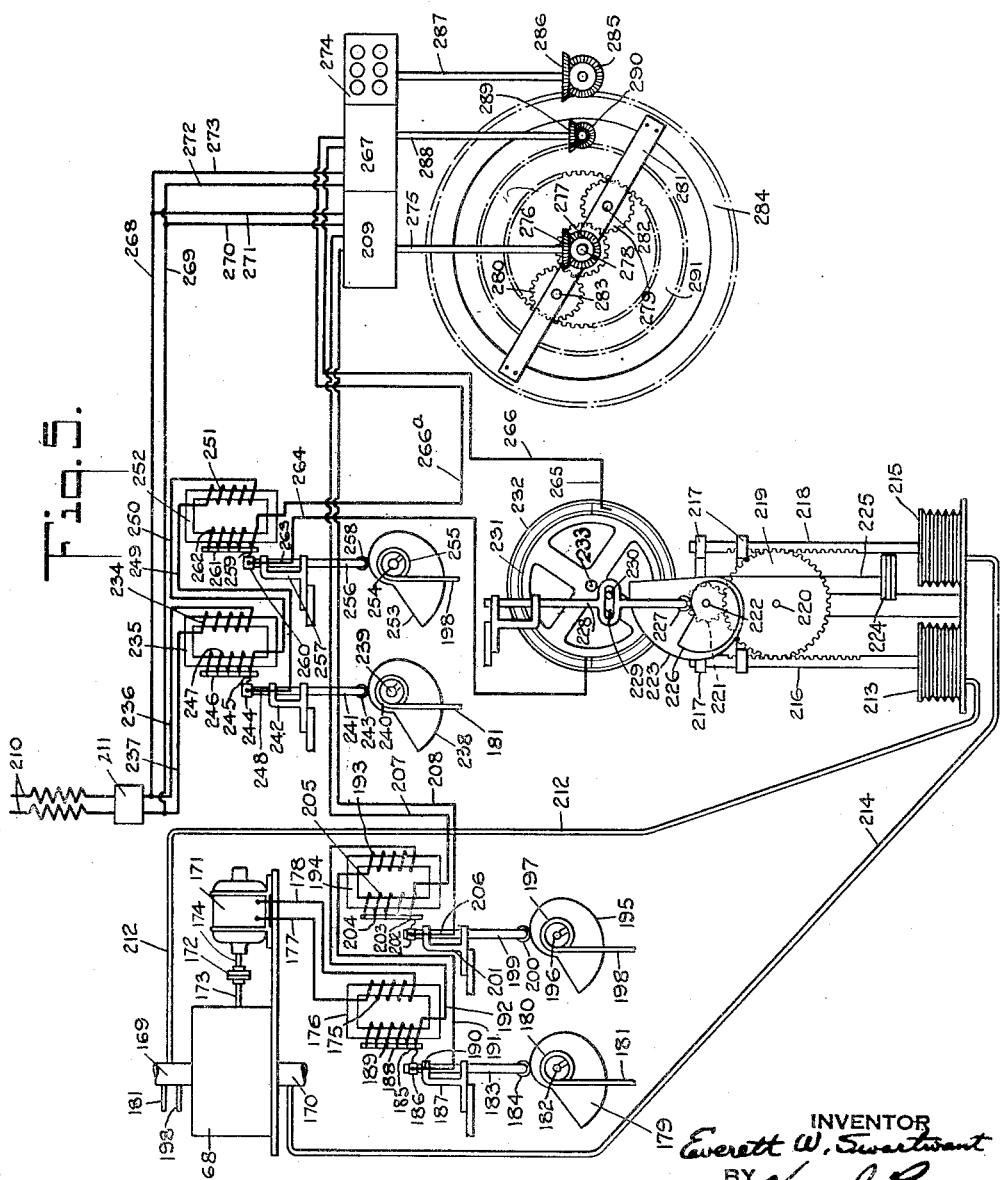

Patented Nov. 24, 1936

2,062,110

UNITED STATES PATENT OFFICE 2,062,110

TRANSFORMER MEASURING INSTRUMENT

Everett W. Swartwout, White Plains, N. Y.; Amy R. Swartwout executrix of said Everett W. Swartwout, deceased Application June 6, 1930, Serial No. 459,604

5 Claims. (Cl. 177—351)

This invention relates to measuring instruments.

More particularly, my invention relates to measuring instruments of those types in which the different impulses, records, and direct or apparent value readings of instruments or devices are corrected separately, or in combination, to compensate for variations from actual values. My invention comprises also means for making transformations from one basis to another basis as by way of obtaining quantities for equations, and automatically solving equations which contain correcting factors, constants, multipliers and the like, to obtain desired or required results in desired terms or units, locally or at remote points.

Another object of my invention is to provide automatic instruments with transferring and transforming means including means for compensating for inefficiencies in transformation, different kinds of impulses to a common kind, as electrical impulses, which may be combined into resultant impulses expressing the results of equations automatically and directly in predetermined or standard units of measurement. Some of the different impulses which may be transferred and transformed into common electrical impulses are impulses responsive to absolute pressure, absolute temperature, specific gravity or density, differential pressure, weight, volume, velocity, and the like when mathematically related in equations yielding the desired final results.

Another object of my invention is to combine a quantity type of meter measuring in units of weight, volume, current, etc., with means for changing the impulses so obtained into electrical impulses corrected for variations in pressure and temperature so that rates of flow, indicated and integrated quantities may be observed, recorded or obtained directly, including corrections for leakage and slip, all automatically in final form of predetermined or standard units of measurement as for example at 60 degrees F. and at standard absolute pressure at sea level.

Another object of my invention is to provide flow meters of the head or kinetic type, the area or geometric type, and the head-area or weir type with means for obtaining the usual various impulses, and means for changing the impulses so obtained into corresponding and relative corrected electrical impulses, combined and arranged to be observed, recorded and derived without calculation, directly in terms of rate of flow and quantity in predetermined or standard units of measurement.

One particular application of my invention is to provide a primary device, commonly known as an orifice meter, which depends for its operation on simple physical principles, with a secondary device comprising my invention to automatically solve the equation of the primary device with its incidental factors, and yield the results in desired terms of predetermined or standard units of measurement such as rates of flow and quantities passed in a given time, to be observed, indicated, integrated and recorded.

Further features of my invention will be understood from the following detail description and the accompanying drawings, in which—

Fig. 1 is a diagrammatic view of one form of my invention, showing a section of pipe line connected with a differential gauge for determining the differential head between two points in a flow stream, a second differential gauge for determining the differential pressure developed as by a constant speed centrifugal fan also shown, with cam means for converting the heads into motion of the secondary devices;

Fig. 2 is a sectional elevation in diagrammatic form, on line 2—2 of Fig. 1, on an enlarged scale;

Fig. 3 is a diagrammatic elevation of an arrangement of successive transformers, applicable to the embodiment illustrated in Fig. 1, and also to a modification thereof;

Fig. 4 shows a detail view of a variable contact; and

Fig. 5 is a diagrammatic view of a further modification.

Considering $$V = C\sqrt{2gh},$$

a well known formula, correctly expresses the flow through an orifice, where V is the velocity of flow in feet per second; C the velocity coefficient which varies primarily according to the size and shape of the orifice in the disc, and the velocity; $g$ the acceleration due to gravity in feet per second; and $h$ the drop in pressure through the orifice in feet of head of the fluid flowing at the temperature, pressure, and density of the gas flowing, and assuming Q to be the volume per unit of time in standard units of measurement, $d$ the diameter of the orifice in inches, P the absolute inlet pressure, T the absolute inlet temperature, $T_1$ the absolute temperature at standard conditions, and D the density or specific gravity of the gas, then, the fundamental formula may be written:—

$$Q = \text{constant} \times d^2 \times \frac{T_1}{P_1} \times C_v \sqrt{\frac{hP}{DT}}$$

Under many actual conditions of use, $d^2$, $T_1$, $P_1$, are constants for any particular rate of flow, $C_v$ is also a constant, and therefore a new constant K may be substituted for such assumed constant values, and the formula written:—

$$Q = K \times \sqrt{h} \times \sqrt{P} \times \sqrt{\frac{1}{D}} \times \sqrt{\frac{1}{T}}$$

In transformers relation of the induced electromotive force generated in the secondary circuit to that employed in the primary circuit is substantially proportional to the ratio of the number of turns in each circuit. By proper proportioning of the turns in the primary and secondary circuits, any desired electromotive force may be obtained in the secondary circuit.

According to my invention, I measure the various units of measurement with mechanical or electrical devices, the impulses from which I term non-electric impulses, and transfer or transform them into electric impulses of the proper degree, and then reduce all electrical impulses to combinable common form, and combine them to solve the equation of the thing to be measured and express the results in the desired final form.

Applying my invention to the orifice or flow meter, I solve the equation of the orifice meter by measuring the impulse of differential head with a suitable differential gauge and move a cam in response to variations in said differential head to change the ratio of primary to secondary windings of a transformer to produce a secondary voltage equal to $$\sqrt{h}.$$

This voltage becomes the primary voltage of the succeeding transformer. I provide a pressure device to measure the variations in, and move in response to variations in the absolute inlet pressure, a cam to change the ratio of primary to secondary windings of a second transformer to produce a secondary voltage equal to $$\sqrt{P};$$

the secondary voltage of the second transformer of the series is now the primary voltage of the third transformer. I provide a cam moved in response to the variations in the density of the gas at standard conditions to vary the ratio of primary to secondary windings of the third transformer to produce a secondary voltage equal to $$\sqrt{\frac{1}{D}}.$$

The secondary voltage of the third transformer now becomes the primary voltage of a fourth transformer. I provide a cam moved in response to variations in the absolute temperature of the gas at the inlet to vary the ratio of primary and secondary turns of the fourth transformer to produce a secondary voltage equal to $$\sqrt{\frac{1}{T}}.$$

The secondary voltage of the fourth transformer is therefore equal to the supply voltage multiplied by $$\sqrt{h}\sqrt{P}\sqrt{\frac{1}{D}}\sqrt{\frac{1}{T}}.$$

I also provide a variable resistance to complete the load circuit on the series of transformers, the said resistance being varied by a cam moved in response to variations in the differential pressure of the orifice to obtain variations in the value of constant K to accord with corresponding variations in the rate of flow.

Applying my invention to meters of the positive rotary displacement type, I provide a generator to generate a voltage in proportion to the variations in the speed of the meter, which generator is driven directly by the meter. The current from this generator is supplied to a transformer in which the ratio of primary to secondary turns is varied in response to variations in the absolute inlet pressure as compared to the absolute pressure of the gas at standard conditions. The secondary voltage of this first transformer in the series becomes the primary voltage of a succeeding transformer. The ratio of turns in the second transformer is varied in response to variations in the ratio of the absolute inlet temperature and the absolute temperature of the gas at standard conditions. The slip of the meter is measured by taking current at constant voltage from a suitable outside source and correct its voltage for pressure and temperature, similarly as above stated. The current in this circuit is varied in response to variations in resistance varied in response to variations in the differential across the meter. The current in each of the two circuits may be measured in suitable current meters, and combined or totalled together on a common counter in desired terms at predetermined conditions.

The current flowing in the circuit of the aforesaid orifice meter embodiment of my invention may likewise be measured in a current meter calibrated to read in cubic feet at any desired standards.

Referring to Fig. 1, the piping 1, having the orifice plate 2, is connected with the differential gage 3, with the piping 4 on the upstream side of the orifice and with the piping 5 on the downstream side of the orifice. The valves 6 and 7 are placed in the piping 4 and 5 for the purpose of disconnecting the meter from the piping 1 when desired.

The differential gage 3 is provided with the float 8 operating on mercury or other desired medium in the compartments 9 and 10. The rod 11 having the rack 12 attached to it is guided in its movement by the bracket 13. The rack 12 operates the gear 12a to transform motion of the float 8 into rotation of the shaft 14. The shaft 14 is supported at its end 15 in the bracket 13 and at its end 16 in the block 17. The block 17 may be of copper or the like and is attached to the body 18 of the differential gage 3. The magnet 19 is mounted on the shaft 14 by means of the nuts 20 and 21.

The movement of the float 8 within the differential gage 3 is transmitted from the interior by means of the motion of the magnet 19 to effect corresponding motion to the magnet 22 and the shaft 23. When preferred, the magnets 19, 22 and the block 17 may be omitted, and the shafts 14, 23 made continuous and integral by adding a stuffing box in the side 18 of the differential gage 3.

A second differential gage 24 measures the differential pressure developed by the centrifugal device 25 so that changes in specific gravity of the gas stream in the piping 1 may be corrected. The differential gage 24 is also connected with the piping 1 through the piping 33, the valve 34 and the piping 35, and with the relatively small size pipe 36, valve 37, pipe 38. The normal capacity of the centrifugal device 25 to discharge through the pipe 27, is relatively greater than the capacity of the pipe 36 returning from the differential gage 24 to the pipe 1. This relatively small pipe 36 provides for constantly changing the sample of gas subjected to increased pressure by the centrifugal device 25.

The heat exchanger 29 may be omitted when the pressure and temperature of the gas in pipe 1 vary appreciably.

The differential pressure developed by the centrifugal device 25 creates a higher pressure in the compartment 39 of the differential gage 24 than in the compartment 40, thus causing the float 41 to rise. Movement of the float 41 moves the rod 42 guided by the bracket 43 to yield corresponding movement of the rack 44 and the gear 45 mounted on the shaft 46. The magnet 47 is mounted on the shaft 46 to transmit internal movement within the differential gage 24 by moving the external magnet 48 accordingly.

The shaft 23 rotates in response to variations in the head or differential pressure across the orifice tube. The cam 49 is mounted on the shaft 23 and is of such contour that the movement of the roller 50 and its rod 51 is in proportion to the square root of the differential pressure, i. e., $$\sqrt{H}$$

see Figs. 1 and 3.

A source 52 of current is provided for the voltage regulator 53 so that constant voltage is supplied through the leads 54 and 55 to the primary winding 56 of the transformer 57. The number of turns in the secondary winding 58 of the pressure responsive transformer 57 is varied by variable contact with the different taps 59 by the shoe 60, mounted on the rod 51 by the insulating block 61. The voltage of the secondary windings thus varied by the position of the shoe 60 is in proportion to $$\sqrt{H}$$

and is carried by flexible connection 62 and the leads 63, 64, to the primary winding 65 of the succeeding or pressure responsive transformer 66.

The pressure responsive device 67, a Bourdon tube or the like, is connected with pipe 1 through the piping 68 and mounted on the cam 69, supported by the shaft 70. The roller 71 connected with the shaft 72, guided by the bracket 73, moves the shoe 74, attached to the shaft 72 by the insulating block 75. The movement of the shoe 74 varies the number of turns of the secondary winding 76 of the transformer 66 so that the voltage in the leads 78, 79 is varied in response to $$\sqrt{P}.$$

The flexible connection 77 and the leads 78, 79, connect with the primary winding 80 of the temperature responsive transformer 81.

The temperature responsive element 82, a Bourdon tube or similar device, is connected with the piping 1 through the piping 83. The temperature responsive device 82 is mounted on the cam 84, supported by the shaft 85.

Pursuant to regular practice, the piping 68, communicating at one end with the pressure responsive Bourdon tube, has its end within the pipe 1 open, as indicated in Fig. 1, whereas the piping 83, connected at one end with the temperature responsive Bourdon tube 82, has its end within the pipe 1 closed-ended, the piping 83 containing an inert gas; nitrogen gas is preferable by reason of its uniform coefficient of expansion over a wide range of temperature.

The shaft 86 carrying the roller 87, operating against the contour of the cam 84 and guided by the bracket 88, transmits movement to the shoe 89 attached to the shaft 86 by the insulating block 90. The movement of the shoe 89 over the variable taps 91 of the secondary winding 92 of the transformer 81 causes a variation in the number of turns in the secondary winding 92 of the transformer 81 in proportion to $$\sqrt{\frac{1}{T}}.$$

The voltage of the secondary winding 92 of the transformer 81 is transmitted through the flexible connection 93, the leads 94, 95 to the primary winding 96 of the density responsive transformer 97.

The cam 98 supported by the shaft 99 gives movement to the shaft 100 through its attached roller 101 when guided by the bracket 102, giving a corresponding movement to the shoe 103, attached to the shaft 100 through the insulating block 104. Movement of the shoe 103 against taps of the secondary winding 105 of the transformer 97 changes the number of turns in response to $$\sqrt{\frac{1}{D}}.$$

The final voltage of the combination of transformers is conveyed through the flexible connection 106 and the lead 107 through a variable resistance 108 and the leads 109, 110 to the recording ammeter 111, the indicating ammeter 112, and the current meter 113, all calibrated to read in terms of desired predetermined standard units of measurement, such as cubic foot measured at standard conditions of 30 inches mercury, absolute pressure and 60 degrees F. temperature.

The variable resistance 108, as illustrated, may be of semi-circular form, having a suitable cross-section, the variable resistance 108 forming with a non-conducting semi-circular ring 114 a complete ring. The thus formed complete ring is enclosed in a glass tube 115, also of ring form, and a quantity of mercury placed within the ring formed of the semi-circular resistance 108 and the semi-circular non-conducting ring 114. The thus combined structure is secured to and carried by any suitable support, such as the illustrated spider, mounted on the shaft 116. The lead 107 is connected to the semi-circular ring 114, and the lead 110 is connected to the flexible connection 117. Rotation of the rings 108, 114, 115 may be accomplished by the element 118, guided by the bracket 119, having the slot 120, engaging the roller 121, all moved by the cam 122 on which the roller 123 attached to the member 118 rides. The cam 122 is mounted on the shaft 23, so that its relative position varies with variations in the rate of flow in the pipe and the consequent position of the float 8 in the differential gage 3. The cam 122 may be calibrated to reproduce all of the coefficients of the orifice 2 for the varying rates of flow.

It will be understood that the desired number of taps on the respective secondary winding of the transformers 57, 66, 81, 97, may be of a number suitable for the requirements of accuracy for the ranges of variation in the quantities represented.

The magnet 48 mounted on the shaft 124 operates the cam 125, see Fig. 2. The cam 125 operates the lever 126, which carries the roller 127, coacting with the cam 125. The lever 126 is pivoted on the shaft 127a, and is counter-balanced by the weights 128, attached to the lever 126 by the rod 129. The lever 126 operates the lever 130 through the connecting pin 131, which in turn operates the yoke 132 pivoted on the shaft 132a, connected to the link 130 by the pin 132b. The movement of the magnet 48 is corrected for pressure variation by the pressure responsive element 133, see also Fig. 1. As illustrated in Figs. 1 and 2, the illustrated pressure responsive element, that is, the Bourdon tube 133, is connected at its one end with the yoke 132 and at its opposite end with the gear 134, to which is secured the smaller gear 134a, meshing with gear 135; the gear 134a is fixed to the shaft 132a, and the gear 134 is freely mounted on the shaft 132a. The gear 135 meshes with the gear 134a and the gear 134 meshes with the gear 135a. The gear 135a is fixed relative to the gear 135 by mounting upon and securement to their common shaft, as indicated in Figs. 1 and 2. The cam 136 is mounted on and secured to the shaft 132a, which is rotatively mounted in the yoke 132, all as indicated in Figs. 1 and 2. Accordingly, through such arrangement, the Bourdon serving as the pressure-responsive element 133 controls the cam 136, in turn controlling the position of the pin 137 which extends jointly in the slot 138 of the yoke 132 and the slot 136a of the cam 136. The pin 137, carried by the link 139, thus moves in response to variations in pressure. The link 139 operates the link 140, pivoted on the shaft 141; and the link 142 through the pins 143, 144; the link 142 through the pin 145 operates the yoke 146 about the shaft 147. The temperature responsive element 148, such as the illustrated Bourdon tube, is connected at its one end to the link 146 and connected at its opposite end through its gearing 149, 150 (similar to gearing 134, 135), to the cam 151 controls the position of the pin 152 which extends jointly in the slot 153 of the yoke 146 and cam slot 151a of cam 151, thus giving motion to the links 154, 155 through the pin 156. The link 155 is pivoted on the shaft 157 and carries at its one end the section of gear 158 co-acting with the gear 159, thus giving motion to the cam 98, and effecting the ratio of the number of primary and secondary turns of the transformer 97 in accordance with $$\sqrt{\frac{1}{D}}.$$

The gear 159, as shown in Fig. 2, is mounted on a suitable shaft; a pointer 159a carried by the gear 159, indicates visually on a graduated scale 159b, the finally corrected valuation, that is to say, in the instance cited, the density of the gas under observation corrected for variations of temperature and pressure, at standard conditions.

The pressure responsive element 133 is connected at its one end 160 either through the stuffing box 161, and the chamber 162 through the piping 163 with the pipe 1, or it may be connected through a flexible hose connection, in lieu of stuffing box 161 and chamber 162. Also the temperature responsive element 148 is connected at its end 164 through the stuffing box 165 and the chamber 166 to the pipe 1 through the piping 167 or through a flexible hose connection in lieu of the stuffing box 165 and chamber 166.

Similarly as stated hereinabove, the piping 163, connected at one end with the pressure responsive element 13, is open-ended within the pipe 1, see 68, Fig. 1, and the end of the piping 167 connected at its one end with the temperature responsive element 148 is close-ended within the pipe 1, see 83, Fig. 1.

Upon referring to Fig. 5 of the drawings, an embodiment of my invention is applied to the measuring of gas by positive displacement meters. The positive displacement meter 168 with its inlet pipe 169 and its outlet pipe 170, operates the synchronous generator 171 through the coupling 172 connecting the shafts 173, 174. Variations in the voltage of the generator 171 are in direct proportion to the quantity of gas passed through meter 168. The volume of gas passed by the meter 168 is in terms of cubic feet displaced in a given time, to which correction for leakage must be made for each given rate of flow, which results must be further corrected for variations of temperature and pressure. To attain the same, the generator 171 is connected with the primary winding 175 of the transformer 176 by the leads 177, 178. The cam 179 is operated by the pressure responsive device 180, connected at its one end with the inlet pipe 169 through the piping 181, and at its other end with the cam 179 operating on the shaft 182. The rod 183, which carries the roller 184 which operates on the cam 179, moves the shoe 185 mounted on the shaft 183 by the non-conducting block 186. The shaft 183 is guided in its movement by the bracket 187. The shoe 185 connects with the taps 188 of the secondary winding 189 of the transformer 176 so that the ratio of the number of turns between the primary and secondary windings of the transformer 176 is in response to the variations in the absolute pressure of the inlet pipe 169.

The secondary windings 189 are connected through the shoe 185, the flexible connection 190, and the leads 191, 192, to the primary winding 193 of the transformer 194. The cam 195 operating on the shaft 196 is connected to and is responsive to the temperature responsive device 197, connected through the inlet pipe 169 through the piping 198. The shaft 199 carrying the roller 200 operates on the contour of the cam 195 and is guided in its movement by the bracket 201; the insulating block 202 controls the movement of the shoe 203. The shoe 203 makes contact with the taps 204 of the secondary winding 205 of the transformer 194 so that the ratio between the number of turns of the primary and secondary windings varies in response to variations of the inlet temperature of the gas in pipe 169.

The current from the secondary winding 204 is transmitted through the flexible connection 206 and the leads 207, 208 to the current meter 209.

For correction of the leakage or slip of the meter 168, I provide current from outside source 210 through the voltage regulator 211 to produce constant voltage with transformers responsive to temperature and pressure variations and with variable resistance varied in response to the differential pressure across meter 168.

The inlet pipe 169 is connected through the piping 212 with the collapsible bellows 213 and the outlet pipe 170 is connected through the piping 214 with the collapsible bellows 215. The collapsible bellows 213 is connected with the rack 216, guided by the bracket 217, and the collapsible bellows 215 is connected with the rack 218, guided by the bracket 217. The racks 216, 218, are connected to opposite sides of the gear 219, supported by the shaft 220. The gear 219 is connected with the gear 221 mounted on the shaft 222, on which shaft 222 the cam 223 is also mounted. The opposed forces of the collapsible bellows 213, 215 is balanced at any pre-determined differential pressure by the weight 224 and the flexible strip 225 operating over the cam 223.

The cam 226 is also mounted on the shaft 222 so that it operates the roller 227, the element 228 having the slot 229 and the pin 230, to cause the semi-circular resistance ring 231 to vary its degree of submergence in mercury in the tube 232 rotating on the shaft 233, all in correspondence to variations of the differential pressure across the meter 168.

The voltage of the current supplied in the source 210 supplies the primary winding 234 of the transformer 235 through the leads 236, 237. The cam 238 operating on the shaft 239 is responsive to the pressure responsive device 240 connected with the inlet pipe 169 through the piping 181. The shaft 241 guided by the bracket 242 is moved by its roller 243 to give motion to the insulated block 244 to which the shoe 245 is attached. The shoe 245 connects with the taps 246 of the secondary winding 247 of the transformer 235. The voltage of the secondary winding 247 varies in response to variations of the pressure of the inlet pipe and is conveyed through the flexible connection 248 and the leads 249, 250 to the primary winding 251 of the temperature responsive transformer 252. The cam 253 operating on the shaft 254 is controlled by the temperature responsive element 255 connected with the inlet pipe 169 by the pipe 198. The shaft 256 guided by the bracket 257 receives its movement through the roller 258 operating on the contour of the cam 253. The shoe 259 is connected with the shaft 256 through the insulated block 260 to make connections with the taps 261 of the secondary winding 262 of the transformer 252. The shoe 259 is also connected through the flexible connection 263 of the lead 264 with the variable resistance 231. The current is then carried through the flexible connection 265 and the lead 266 to the current meter 267, and return lead 266a.

The current meters 209 and 267 may be supplied with constant voltage by the leads 268, 269, 270, 271, 272, and 273 by any suitable source.

The movements of the current meters 209 and 267 are now totalled together to be observed in the counting mechanism 274.

The current meter 209 operates shaft 275 and beveled gears 276, 277 and the shaft 278. The pinions 279, 280, are connected with the bracket 281 through the shafts 282, 283. The bracket 281 rotates freely on its shaft 278. The bracket 281 is connected at its opposite ends to the bevel gear ring 284; the teeth of the ring 284 mesh with the teeth of the bevel gear 285, which in turn mesh with the teeth of the bevel gear 286, which is fixedly mounted on the shaft 287, operating the counter 274.

The current meter 267 operates the shaft 288 and the beveled gears 289, 290, which in turn operate the bevel gear 291, thus adding to the movement of the shaft 275 so that the movement of the shaft 287 is the total of the movements of shafts 275 and 288. The gear 291 has internal gear teeth meshing with gears 279, 280.

From the foregoing, the readings of the counter 274 may be made in terms of standard gas and for pre-determined standard conditions of measurement irrespective of variations of the inlet pressure or the inlet temperature to the meter 168 and irrespective of variations of quantities displaced by meter 168.

Referring to Figure 4, I have shown an arrangement of the taps of a typical transformer which may be used in connection with the system. The transformer 57 having the primary winding 56 supplied by the leads 54, 55, and having the secondary winding 58 and the taps 59 may have these taps 59 formed in the insulating block 292 so that any desired number of taps 59 may be utilized and arranged to terminate in the insulating block 292, see Figure 4, so even slight variations in the exact number of turns of the secondary winding 58 are obtained to produce any desired limit of error between the adjoining taps 59 as desired.

The contour of the cams 49, 69, 84, 98, 122, 179, 195, 238, 255, and 223 may be made to follow the factors which they represent in the equations. The contour of these cams may be modified to follow the mathematical relationships of the quantities represented in the equations; and also modifications in the contour of the respective cams 49, 69, 84, 98, 122, 179, 195, 238, 255, and 223 may be made to compensate for inefficiencies and losses in the transformers or electrical equipment which they control to make the electrical impulses exactly follow the relationship of the quantities represented in the equations.

Recording charts, of the standard types as manufactured, 292a, 293, 294 and the like may be operated in conjunction with the operating mechanism controlling the cams representing the different quantities so that graphical records of the quantities as for example, pressure, temperature, differential head may be recorded.

The above cited illustrations set forth the desired evaluation of a quantity, corrected for determined conditions, by a method involving the use of instrumentalities applying the correction or corrections as factors of multiplication. Thus, in the embodiment of my invention employing cams, such correction or corrections applied as factors of multiplication are effected mechanically, whereas, in the use of electrical transformers, the correction or corrections are applied as factors of multiplication effected electrically. In such applications of my invention, the correction of the observed value to evaluation at standard conditions, is effected continuously, whereby the derived or final evaluation is indicated, either visually or graphically, continuously at all times and at all times continuous in corrected evaluation.

In the employment of a Bourdon tube for correction of variations of pressure, the connection of the Bourdon tube with the pipe or other container through which the gas under observation is passing, is pursuant to standard practice. That is to say, the non-movable end of the Bourdon tube 133 in the mechanical embodiment indicated in Figs. 1 and 2, and similarly the non-movable end of the Bourdon tube 67, in the electrical embodiment of my invention illustrated in Fig. 3, is communicatively connected with the pipe, whereby variations of pressure of the gas under observation is directly communicated to the interior of the Bourdon tube.

In the employment of a Bourdon tube for correction of variations of temperature, the piping connecting the non-movable end of the Bourdon tube 148 in the mechanical embodiment indicated in Figs. 1 and 2, and similarly the non-movable end of the Bourdon tube 82 in the electrical embodiment of my invention illustrated in Fig. 3, is communicatively connected with a piping which leads to and ends in a so-called "bulb", which projects into the pipe or other container through which the gas under observation is flowing; such piping is filled with any suitable inert gas, usually nitrogen gas which is preferable by reason of its uniform coefficient of expansion over a wide range of temperature. Variations of temperature, as well understood by those skilled in the art, are transmitted from the gas under observation to the movable end of the Bourdon tube by reason of the expansion or contraction of the enclosed inert gas, thus giving rise to corresponding variation of pressure of such enclosed inert gas, and consequent corresponding movement of the movable end of the Bourdon tube.

From the above, it is apparent that pursuant to my invention, the value or values representing desired phase or phases of operation of a device or any arrangement subject to variable operation and condition are automatically corrected or otherwise transformed for any standard conditions, usually absolute conditions in engineering and other practice; any other desired basis of conventionally accepted standard conditions may be selected.

From the engineering point of view, my invention is highly advantageous for solving the so-called "equation" of the device or arrangement under observation.

Whereas I have illustrated my invention with the use of cams as elements of the respective circuits or equivalent arrangements for correcting or transforming actual values into values under absolute or other assumed or standard conditions, such cam element has been selected by reason of it's high degree of applicability to varying conditions met with in engineering problems. As will be perceived, the contour of a cam may be developed from calibrations of the operation and condition responsive device, such as an orifice meter, temperature device and the like, which calibrations when embodied in the cam contour control the transformation desired and effect the desired correction. However, any other device may be employed in a similar or other proper manner for carrying out the purposes of my invention.

From the above, it is also apparent that the instrumentalities employed for effecting the correction or other transforming of values are actuated by impulses, and in turn yield impulses modified by the desired corrections or other transformations which modified impulses are converted into impulses of common, i. e., combinable, form to effect a final integration of the values involved, and thereby solve the "equation" of the device. In many instances, the original impulses are non-electrical in nature, but by reason of the ready conversion and availability of electrical measuring instruments for integration, the converted or resulting impulses are transformed into electrical impulses.

In certain of the above examples illustrating my invention, I have taken into consideration all of the variable factors entering the solution of an engineering equation. However, it is apparent that the "equation" may be solved for only one variable factor, thereby requiring or utilizing but one step of correction or transformation, and thus carrying out my invention in a simplified form. In such instances and other instances of use, the total correction or transforming circuits and appurtenant elements including the meters or other measuring instruments may be retained, and each constant factor represented by a "cam" of constant distance from its center to its periphery, which geometrically is a disk of circular cross-section.

Whereas, I have described my invention by reference to specific forms thereof, it will be understood that many changes and modifications may be made without departing from the spirit of the invention.

I claim:

1. In an electrical measuring device for integrating a plurality of varying and variable factors, the combination of a source of constant electric current, a plurality of transformers equal in number to the varying and variable factors to be integrated, said transformers being arranged in cascade relation, and means for varying the effective turns of the secondary winding of each of said transformers in accordance with the characteristics of the varying and variable factors to be integrated, the first one of said plurality of transformers being connected in series with the source of constant current, and an indicating and recording instrument connected to the last one of said plurality of transformers.

2. In an electrical measuring and recording device for integrating a plurality of varying and variable factors and recording the results of such integration, the combination of a source of constant current, a plurality of transformers connected seriatum and connected to said source of constant current, means associated with each of the secondaries of the transformers for varying the effective turns thereof in accordance with the character of the varying and variable factors to be measured and recorded, whereby the primary of a succeeding transformer in the transformers arranged seriatum is correspondingly controlled by the preceding transformer, and an indicating and recording device arranged in series with the last transformer of the series.

3. In an improved electrical indicating and recording device for integrating a plurality of varying and variable factors and visually indicating and recording the same, the combination of a constant current supply, a plurality of electrical transformers arranged in series relation and with the primary of the first transformer of the series connected in series with the source of constant current and with the secondary of each preceding transformer connected in series with the primary of the next succeeding transformer, and with the indicating and recording devices connected in series with the secondary of the last transformer of the series, and means associated with the secondary of each transformer of the series for varying the effective winding turns thereof in accordance with the varying and variable character of the factors to be indicated and recorded, whereby the effectiveness of each succeeding transformer of the series is varied in accordance with the effective winding turns of the preceding transformer, and whereby the cumulative effects of the varying and variable factors to be indicated and recorded are visually indicated and recorded on the indicating and recording devices, respectively.

4. In an electrical measuring device, the combination of a source of power, a plurality of electrical transformers arranged in cascade and with the first one of the cascade connected in series with the source of power, a voltage regulator interposed between the source of power and the plurality of transformers, a recording device connected to the secondary of the last transformer, and means connected with each of the secondary windings for varying the ratio thereof with respect to the primary windings in accordance with the characteristics of the varying and variable factors to be measured, whereby each succeeding transformer of the cascade is variably affected in accordance with the characteristics of the results produced on the secondary windings of the preceding transformers by the varying and variable effects of the factors to be measured, whereby the cumulative effects produced by said varying and variable factors are recorded on the recording device.

5. In an electrical measuring device for multiplying the effects of a plurality of varying and variable factors, the combination of a source of constant current, a plurality of electrical transformers equal in number to the number of factors to be multiplied and arranged seriatum and with the primary of the first transformer connected in series to the source of power, an indicating device connected in series with the secondary of the last electrical transformer of the series, and means associated with each of the secondary windings of the electrical transformers for varying the ratio between the windings thereof in accordance with the characteristics of the varying and variable factors to be multiplied, whereby each succeeding transformer of the series is variably controlled by the effective turns of the secondary windings of each of the preceding transformers and the cumulative effect produced thereby is recorded on the recording instrument.

EVERETT W. SWARTWOUT.